US012165495B2

(12) United States Patent
Paxton

(10) Patent No.: US 12,165,495 B2
(45) Date of Patent: Dec. 10, 2024

(54) VIRTUAL PARTITION OF A SECURITY SYSTEM

(71) Applicant: Nice North America LLC, Carlsbad, CA (US)

(72) Inventor: Eric Paxton, Oceanside, CA (US)

(73) Assignee: Nice North America LLC, Carlsbad, CA (US)

( * ) Notice: Subject to any disclaimer, the term of this patent is extended or adjusted under 35 U.S.C. 154(b) by 322 days.

(21) Appl. No.: 16/289,400

(22) Filed: Feb. 28, 2019

(65) Prior Publication Data

US 2020/0279473 A1 Sep. 3, 2020

(51) Int. Cl.
*G08B 13/00* (2006.01)
*G08B 13/196* (2006.01)
*G08B 25/00* (2006.01)

(52) U.S. Cl.
CPC ....... *G08B 25/008* (2013.01); *G08B 13/1968* (2013.01)

(58) Field of Classification Search
CPC .......................... G08B 25/008; G08B 13/1968
See application file for complete search history.

(56) References Cited

U.S. PATENT DOCUMENTS 4,974,601 A * 12/1990 Tranjan ............. A61B 5/02438 600/509
5,091,780 A * 2/1992 Pomerleau ....... G08B 13/19697 348/262
5,225,806 A * 7/1993 Stanley-Arslanok ........................ G08B 25/14 340/541
5,416,725 A * 5/1995 Pacheco ................. G08B 25/14 340/508
6,035,016 A * 3/2000 Moore ................... H04M 11/04 379/37
6,049,753 A * 4/2000 Nimura ............. G01C 21/3484 701/428
6,067,502 A * 5/2000 Hayashida ........... G01C 21/367 701/428
6,147,601 A * 11/2000 Sandelman ............ G08B 25/08 340/539.18
6,157,299 A * 12/2000 Wang .................. G08B 25/002 340/541
6,160,477 A * 12/2000 Sandelman .............. F24F 11/49 340/539.18

(Continued)

FOREIGN PATENT DOCUMENTS

WO WO-2012119253 A1 9/2012
WO WO-2020176799 A1 9/2020
WO WO-2020176802 A1 9/2020

OTHER PUBLICATIONS

Ali et al, Cyber and Physical Security Vulnerability Assessment for IoT-Based Smart Homes (Year: 2018).*

(Continued)

*Primary Examiner* — Quang Pham
(74) *Attorney, Agent, or Firm* — Fox Rothschild LLP

(57) ABSTRACT

A security system identifies sensors in communication with the security system, and the partition attribute for each sensor is identified. The partition attribute of each sensor identities one or more partitions of the security system. The security system forms partitions based on the partition attributes.

20 Claims, 13 Drawing Sheets

(56) References Cited

U.S. PATENT DOCUMENTS 6,211,782 B1 * 4/2001 Sandelman ......... G06F 11/0748 340/539.18
6,380,851 B1 * 4/2002 Gilbert ................... G08B 25/14 340/517
6,400,265 B1 * 6/2002 Saylor ................ G08B 13/1966 340/506
6,408,232 B1 * 6/2002 Cannon .................. G08G 1/017 701/32.4
6,563,430 B1 * 5/2003 Kemink ........... H04N 21/42202 340/8.1
6,633,240 B1 * 10/2003 Sweatt ................... G08B 25/10 340/601
6,661,340 B1 * 12/2003 Saylor .................. G08B 25/016 340/7.52
6,970,077 B2 * 11/2005 Johnson ............... G08B 29/126 340/517
6,989,745 B1 * 1/2006 Milinusic ......... G08B 13/19691 340/517
7,113,090 B1 * 9/2006 Saylor .................. G08B 25/005 340/539.18
7,161,481 B2 * 1/2007 Turner ..................... G07C 3/08 340/506
7,259,656 B1 * 8/2007 Wright ................. G09B 29/102 340/539.2
7,302,323 B2 * 11/2007 Anderson .............. G07C 5/008 701/32.7
7,859,571 B1 * 12/2010 Brown ............. G08B 13/19645 348/211.3
7,961,089 B2 * 6/2011 McSheffrey ......... A61N 1/3904 340/517
8,000,694 B2 * 8/2011 Labidi .................. G06Q 10/109 455/418
8,350,694 B1 * 1/2013 Trundle ................. G08B 25/10 340/539.11
8,365,278 B1 * 1/2013 Njemanze ........... H04L 63/1416 726/22
8,369,487 B2 * 2/2013 Alexander Elliot .... H04L 12/66 379/40
8,369,967 B2 * 2/2013 Hoffberg ............ G06Q 30/0267 700/79
8,384,539 B2 * 2/2013 Denny .................... G06F 17/00 340/539.18
8,447,265 B2 * 5/2013 Flippo ..................... G01S 19/34 455/574
8,473,619 B2 * 6/2013 Baum ................. H04L 12/2834 709/227
8,531,294 B2 * 9/2013 Slavin ................ G08B 13/2491 340/568.1
8,612,591 B2 * 12/2013 Dawes .................. H04L 67/025 709/219
8,635,350 B2 * 1/2014 Gutt ...................... H04L 61/103 709/229
8,660,790 B2 * 2/2014 Stahl .................. G06Q 10/1093 701/465
8,693,610 B2 * 4/2014 Hess ........................ G21C 9/00 376/277
8,698,614 B1 * 4/2014 Trundle ............... G08B 29/185 340/507
8,705,704 B2 * 4/2014 Smith .................... G08B 25/08 379/37
8,705,716 B2 * 4/2014 Gregory .................. H04M 3/38 709/224
8,713,132 B2 * 4/2014 Baum ................... H04L 67/025 709/217
8,779,921 B1 * 7/2014 Curtiss ................. G08B 25/009 340/541
8,988,232 B1 * 3/2015 Sloo ...................... G01J 1/4204 340/602
9,110,541 B1 * 8/2015 Zhou ....................... G06F 3/017
9,342,223 B2 * 5/2016 Dharmalingam ... G06F 3/04815
9,489,534 B2 * 11/2016 Hashii ..................... G06F 21/62
9,516,215 B1 * 12/2016 Datikashvili ......... G06F 3/0412
9,565,575 B2 * 2/2017 Kore ...................... G08B 29/16
9,571,510 B1 * 2/2017 Shen ..................... H04L 63/306
9,599,967 B2 * 3/2017 Price .................... G04G 13/026
9,686,686 B1 * 6/2017 Dalvi ...................... H04W 4/24
9,693,386 B2 * 6/2017 Gallo .................... G06F 3/0481
9,997,036 B2 * 6/2018 Scalisi ................ H04L 12/2818
10,055,108 B2 * 8/2018 Bates ................. H04N 21/8113
10,091,014 B2 * 10/2018 Dawes ................ H04L 12/2825
10,310,621 B1 * 6/2019 Lien ........................ H04W 4/80
10,437,448 B2 * 10/2019 Moses .................... G08B 25/14
10,448,434 B1 * 10/2019 Warren .................. H04W 4/80
10,574,945 B1 * 2/2020 Seyfi ...................... H04N 7/185
10,832,545 B2 * 11/2020 Ouellette ........... G08B 13/2454
10,852,018 B1 * 12/2020 Floro ....................... F24F 11/65
11,315,394 B1 * 4/2022 Jackson ................. G08B 13/18
11,343,665 B2 * 5/2022 Wong ...................... H04L 67/12
11,379,798 B2 * 7/2022 Park ...................... G06F 3/0482
11,495,118 B2 * 11/2022 Wedig .................... G08B 17/00
11,562,434 B2 * 1/2023 Wedig .................... G06Q 40/08
11,854,354 B2 * 12/2023 Chua .................... G08B 25/009
11,995,541 B2 * 5/2024 Nguyen ................... G06N 7/01
2002/0099550 A1 * 7/2002 Emerick, Jr. ........ G04G 13/021 704/270
2002/0099823 A1 * 7/2002 Jemes ....................... H04L 9/40 709/225
2003/0071199 A1 * 4/2003 Esping ............ G08B 13/19652 250/221
2003/0202101 A1 * 10/2003 Monroe ........... G08B 13/19695 348/E7.086
2004/0174256 A1 * 9/2004 Hershkovitz ........ G08B 25/008 700/83
2004/0189471 A1 * 9/2004 Ciarcia, Jr. ........ G08B 13/2417 340/8.1
2004/0267385 A1 * 12/2004 Lingemann ............ G05B 15/02 700/83
2005/0035855 A1 * 2/2005 Sarnowsky ............ G08C 17/02 340/13.24
2005/0079880 A1 * 4/2005 Donner .................... H04Q 9/00 455/414.1
2005/0128068 A1 * 6/2005 Winick ................ G08B 25/008 340/517
2005/0149677 A1 * 7/2005 Shimada ............... G06F 3/0644 711/170
2005/0192742 A1 * 9/2005 Okochi .............. G01C 21/3484 340/995.19
2005/0253706 A1 * 11/2005 Spoltore .............. G08B 25/009 340/541
2006/0155666 A1 * 7/2006 Diehl ...................... G06F 21/80
2007/0028244 A1 * 2/2007 Landis .................. G06F 9/4555 718/108
2007/0061441 A1 * 3/2007 Landis .................. G06F 9/4555 709/224
2007/0067366 A1 * 3/2007 Landis .................. G06F 12/109
2007/0139182 A1 * 6/2007 O'Connor ............... H04W 4/90 340/539.22
2007/0139183 A1 * 6/2007 Kates ................... G08B 25/005 340/539.22
2007/0229517 A1 * 10/2007 May ..................... G06Q 10/109 345/501
2007/0279209 A1 * 12/2007 Kogan ................ B60R 25/1004 340/541
2008/0005784 A1 * 1/2008 Miliefsky ........... H04L 63/1433 726/1
2008/0088438 A1 * 4/2008 Aninye .............. G08B 21/0286 340/539.13
2008/0109099 A1 * 5/2008 Moshier ................. G06Q 10/06 700/103
2009/0010197 A1 * 1/2009 Chao ...................... H04H 20/61 370/312
2009/0036148 A1 * 2/2009 Yach ................. H04M 1/72451 340/539.2
2009/0045952 A1 * 2/2009 Bahari ............. G08B 13/19697 340/541
2009/0096615 A1 * 4/2009 Reeder ................. G08B 25/008 340/573.4
2009/0157877 A1 * 6/2009 Baek ................... H04L 12/2803 709/225

(56) References Cited

U.S. PATENT DOCUMENTS

2009/0261943 A1* 10/2009 Jana G08B 25/012 340/3.1
2009/0264150 A1* 10/2009 Andreasson H04L 67/14 455/556.1
2009/0295918 A1* 12/2009 Horovitz G06F 3/04817 348/143
2010/0004816 A1* 1/2010 Bauchot G06Q 10/00 701/33.4
2010/0085310 A1* 4/2010 Becker G06F 3/0483 345/172
2010/0161630 A1* 6/2010 Moriwaki H04L 67/12 707/E17.014
2010/0176962 A1* 7/2010 Yossef H04Q 1/136 709/224
2010/0188197 A1* 7/2010 Ackley G08C 17/02 340/10.1
2010/0241744 A1* 9/2010 Fujiwara H04L 43/00 709/224
2010/0241862 A1* 9/2010 Garcia Morchon H04L 63/061 713/171
2010/0277315 A1* 11/2010 Cohn H04L 12/2809 340/541
2010/0279649 A1* 11/2010 Thomas G06Q 10/10 455/404.2
2010/0289644 A1* 11/2010 Slavin G08B 25/14 340/568.1
2010/0299118 A1* 11/2010 Sharma G05B 23/024 703/2
2010/0312366 A1* 12/2010 Madonna G06F 3/04815 715/848
2011/0082618 A1* 4/2011 Small G06F 3/04886 345/173
2011/0082619 A1* 4/2011 Small G06F 3/04886 701/31.4
2011/0082620 A1* 4/2011 Small G06F 3/04883 701/31.4
2011/0231451 A1* 9/2011 Hamamura G06F 16/23 707/802
2011/0274251 A1* 11/2011 Omernick A61B 6/548 378/98.8
2012/0086568 A1* 4/2012 Scott G05B 15/02 340/501
2012/0086573 A1* 4/2012 Bischoff G08B 21/0492 340/573.1
2012/0092158 A1* 4/2012 Kumbhar G08B 15/00 340/541
2012/0120773 A1* 5/2012 O'Toole G04G 13/02 368/73
2012/0120930 A1* 5/2012 Ji H04L 12/2818 370/338
2012/0130513 A1* 5/2012 Hao G05B 15/02 700/90
2012/0154108 A1* 6/2012 Sugaya G08C 17/02 340/5.1
2012/0169487 A1* 7/2012 Poder G08B 25/10 340/426.15
2012/0197898 A1* 8/2012 Pandey H04L 67/12 707/741
2012/0286951 A1* 11/2012 Hess G08B 25/008 340/539.1
2012/0310598 A1* 12/2012 Gregory G06F 1/3287 702/187
2013/0009778 A1* 1/2013 Bautovich G07C 3/00 340/573.4
2013/0018284 A1* 1/2013 Kahn G04G 21/04 600/595
2013/0021155 A1* 1/2013 Gandara C12N 15/8222 29/593
2013/0100268 A1* 4/2013 Mihailidis G08B 21/02 348/77
2013/0116922 A1* 5/2013 Cai G01C 21/206 701/515
2013/0157612 A1* 6/2013 Cordero H04N 23/698 348/36
2013/0218456 A1* 8/2013 Zelek G01C 21/3652 701/411
2013/0247137 A1* 9/2013 Puri H04L 63/20 726/1
2013/0271286 A1* 10/2013 Quan H04Q 9/00 340/691.6
2013/0276144 A1* 10/2013 Hansen H04L 63/08 726/29
2013/0331087 A1* 12/2013 Shoemaker H04L 12/2829 455/420
2014/0032895 A1* 1/2014 Moon G04G 13/026 713/100
2014/0100893 A1* 4/2014 Zizzi H04L 9/0897 705/4
2014/0128994 A1* 5/2014 Hallman H04L 12/2809 700/12
2014/0143695 A1* 5/2014 Sundermeyer G08B 13/1968 715/765
2014/0198628 A1* 7/2014 Yang G04G 13/02 368/262
2014/0211099 A1* 7/2014 Saha H04W 4/021 348/734
2014/0218514 A1* 8/2014 Dziadosz H04L 63/104 340/5.6
2014/0218518 A1* 8/2014 Oliver G08B 13/1672 348/143
2014/0235265 A1* 8/2014 Slupik H04L 67/125 455/456.1
2014/0243021 A1* 8/2014 Lerenc H04W 4/027 455/456.3
2014/0266764 A1* 9/2014 Henrie G08B 5/38 340/691.1
2014/0267112 A1* 9/2014 Dunn G06F 3/04845 345/173
2014/0281990 A1* 9/2014 Gu G08B 13/19684 715/719
2014/0306833 A1* 10/2014 Ricci G06V 40/28 340/901
2014/0309870 A1* 10/2014 Ricci A61B 5/7405 701/36
2014/0313044 A1* 10/2014 Thompson G08B 21/14 340/686.6
2014/0359101 A1* 12/2014 Dawes G06F 3/0412 709/223
2014/0368621 A1* 12/2014 Michiyama H04N 13/156 348/50
2015/0002292 A1* 1/2015 Cavalcanti G08B 21/0275 340/539.12
2015/0049592 A1* 2/2015 Braswell G04G 11/00 368/250
2015/0051754 A1* 2/2015 Kwon G07C 9/00309 701/1
2015/0061841 A1* 3/2015 Lee G08C 23/04 340/12.5
2015/0074582 A1* 3/2015 Shearer G06F 3/0481 715/771
2015/0230056 A1* 8/2015 Shin H04L 12/2818 455/420
2015/0235547 A1* 8/2015 Vardi G08B 13/1463 340/539.12
2015/0248275 A1* 9/2015 Gallo G01T 7/00 702/189
2015/0293509 A1* 10/2015 Bankowski H04L 12/2818 700/275
2015/0304406 A1* 10/2015 Penilla G06Q 30/0643 709/203
2015/0339031 A1* 11/2015 Zeinstra B60K 35/10 715/747
2015/0341375 A1* 11/2015 Bauer H04L 63/107 726/22
2015/0358387 A1* 12/2015 Smereka H04W 4/80 715/740
2016/0018798 A1* 1/2016 Jiang H04L 12/282 700/275

(56) References Cited

U.S. PATENT DOCUMENTS

| | | | | |
|---|---|---|---|---|
| 2016/0034762 | A1* | 2/2016 | Chang | G08B 13/1963 345/633 |
| 2016/0065414 | A1* | 3/2016 | Sundermeyer | G08B 13/00 370/254 |
| 2016/0085412 | A1* | 3/2016 | Meganathan | H04W 4/02 715/739 |
| 2016/0094582 | A1* | 3/2016 | Watson | H04L 41/0273 726/1 |
| 2016/0193983 | A1* | 7/2016 | Sawada | B60R 25/102 348/148 |
| 2016/0197999 | A1* | 7/2016 | Chun | H04L 67/567 709/217 |
| 2016/0323548 | A1* | 11/2016 | Khot | G06F 3/04842 |
| 2016/0337720 | A1* | 11/2016 | Krishnamurthy | H04W 84/18 |
| 2016/0357176 | A1* | 12/2016 | Chand | G05B 19/0428 |
| 2016/0359825 | A1* | 12/2016 | Chand | G06F 21/64 |
| 2016/0359873 | A1* | 12/2016 | Chand | G06F 21/57 |
| 2016/0379476 | A1* | 12/2016 | Sella | G08B 21/0453 340/539.19 |
| 2017/0004205 | A1* | 1/2017 | Jain | G06N 5/022 |
| 2017/0032658 | A1* | 2/2017 | Magyar | G08B 25/008 |
| 2017/0076583 | A1* | 3/2017 | Hua | G08B 25/008 |
| 2017/0076584 | A1* | 3/2017 | Eskildsen | G06F 21/552 |
| 2017/0080898 | A1* | 3/2017 | Cogill | B60R 25/30 |
| 2017/0082997 | A1* | 3/2017 | Lu | G05B 19/0428 |
| 2017/0103644 | A1* | 4/2017 | Chauhan | H04L 12/2816 |
| 2017/0186309 | A1* | 6/2017 | Sager | G08B 29/188 |
| 2017/0191693 | A1* | 7/2017 | Bruhn | F24F 11/58 |
| 2017/0193803 | A1* | 7/2017 | Dey | G08B 25/008 |
| 2017/0322715 | A1* | 11/2017 | Cohrt | G06F 3/04817 |
| 2017/0372600 | A1* | 12/2017 | Palin | H04W 4/80 |
| 2018/0031371 | A1* | 2/2018 | Mankovskii | H04W 4/38 |
| 2018/0063681 | A1* | 3/2018 | Mankovskii | H04W 4/023 |
| 2018/0137743 | A1* | 5/2018 | Tanaka | G08B 5/22 |
| 2018/0174413 | A1* | 6/2018 | Siminoff | H04N 7/186 |
| 2018/0176512 | A1* | 6/2018 | Siminoff | H04N 7/188 |
| 2018/0197393 | A1* | 7/2018 | Gallo | G08B 25/10 |
| 2018/0203723 | A1* | 7/2018 | Krueger | G06F 3/0673 |
| 2018/0203807 | A1* | 7/2018 | Krueger | G06F 12/0842 |
| 2018/0211301 | A1* | 7/2018 | Davies | G06Q 50/265 |
| 2018/0211510 | A1 | 7/2018 | Poder | |
| 2018/0330170 | A1* | 11/2018 | Oya | G06V 20/53 |
| 2018/0373236 | A1* | 12/2018 | Ewert | G08G 1/017 |
| 2018/0375444 | A1* | 12/2018 | Gamroth | G05B 19/0426 |
| 2019/0005942 | A1* | 1/2019 | Ma | G08B 25/008 |
| 2019/0042063 | A1* | 2/2019 | Mizuno | G06F 3/04817 |
| 2019/0051122 | A1* | 2/2019 | Fulker | H04L 69/40 |
| 2019/0116305 | A1* | 4/2019 | Lee | H04N 23/69 |
| 2019/0149696 | A1* | 5/2019 | Drako | G08B 13/1965 382/103 |
| 2019/0176752 | A1* | 6/2019 | Cermak | B60R 25/209 |
| 2019/0187283 | A1* | 6/2019 | Kathan | G01S 17/88 |
| 2019/0190738 | A1* | 6/2019 | Jiang | H04L 12/2803 |
| 2019/0196692 | A1* | 6/2019 | Ma | G06F 3/0484 |
| 2019/0212909 | A1* | 7/2019 | Napier | G06F 3/03547 |
| 2019/0272730 | A1* | 9/2019 | Ragland | H04L 67/125 |
| 2019/0288868 | A1* | 9/2019 | Mosalem | H04W 4/44 |
| 2019/0289134 | A1* | 9/2019 | Dawes | H04L 12/2827 |
| 2019/0372862 | A1* | 12/2019 | Carrigan | H04L 41/0813 |
| 2020/0053325 | A1* | 2/2020 | Deyle | H04N 7/185 |
| 2020/0097734 | A1* | 3/2020 | Miyake | G06V 20/52 |
| 2020/0226388 | A1* | 7/2020 | Ghessassi | G06V 40/174 |
| 2020/0279473 | A1* | 9/2020 | Paxton | G08B 25/008 |
| 2020/0279475 | A1 | 9/2020 | Paxton | |
| 2021/0097315 | A1* | 4/2021 | Carruthers | G08B 13/19645 |
| 2022/0031172 | A1* | 2/2022 | He | H01Q 9/0428 |

OTHER PUBLICATIONS

Boussard et al., Future Spaces: Reinventing the Home Network for Better Security andAutomation in the IoT Era (Year: 2018).*

Yang et al., Security and Privacy of Smart Home Systems Based on the Internet of Things and Stereo Matching Algorithms (Year: 2020).*

IP, Appearance of Virtual Character Reflects User Security Risk Attributes (Year: 2013).*

Ohoussou et al., Autonomous agent based intrusion detection in virtual computing environment (Year: 2010).*

Sanjay Madria, Sensor Cloud Sensing-as-a-Service Paradigm (Year: 2018).*

Varadharajan et al., On the Design and Implementation of an Integrated Security Architecture for Cloud with Improved Resilience (Year: 2017).*

Zhao et al., The Application of Virtual Machines on System Security (Year: 2009).*

Hardwire (verb) American English definition and synonyms _ Macmillan Dictionary.*

Patrick McNeil, Secure IoT deployment in the cement industry (Year: 2017).*

Patrick McNeil, Secure Internet of Things Deployment in the Cement Industry Guidance for Plant Managers (Year: 2018).*

Stauffer et al., Smart enabling system for home automation (Year: 1991).*

"U.S. Appl. No. 16/289,437, Non Final Office Action mailed Jul. 22, 2020", 32 pgs.

"International Application Serial No. PCT/US2020/020226, International Search Report mailed Jul. 1, 2020", 8 pgs.

"International Application Serial No. PCT/US2020/020226, Written Opinion mailed Jul. 1, 2020", 8 pgs.

"International Application Serial No. PCT/US2020/020230, International Search Report mailed Jun. 30, 2020", 3 pgs.

"International Application Serial No. PCT/US2020/020230, Written Opinion mailed Jun. 30, 2020", 4 pgs.

"U.S. Appl. No. 16/289,437, Final Office Action mailed Feb. 9, 2021", 43 pgs.

"U.S. Appl. No. 16/289,437, Response filed Oct. 22, 2020 to Non Final Office Action mailed Jul. 22, 2020", 14 pgs.

"AT&T Integrates Home Security and Automation Controls with the Connected Car", (2015).

Deng, et al., "Research of Intelligent Home Control System", (2010).

Fujita, et al., "Menu Driven User Interface for Home System", (1994).

Nichols, et al., "Controlling Home and Office Appliances with Smart Phones", (2006).

Putra, et al., "Monitor and Control Panel of Building Security", (2017).

"U.S. Appl. No. 16/289,437, Non Final Office Action mailed Aug. 27, 2021", 45 pgs.

"U.S. Appl. No. 16/289,437, Response filed Jun. 7, 2021 to Final Office Action mailed Feb. 9, 2021", 12 pgs.

"International Application Serial No. PCT/US2020/020226, International Preliminary Report on Patentability mailed Sep. 10, 2021", 8 pgs.

"International Application Serial No. PCT/US2020/020230, International Preliminary Report on Patentability mailed Sep. 10, 2021", 6 pgs.

CONTROL4, "The Connected Car Meets the Connected Home", https://www.control4.com/blog/366/the-connected-car-meets-the-connected-home/, (2016), 6 pages.

* cited by examiner

VIRTUAL PARTITION OF A SECURITY SYSTEM

CROSS-REFERENCE TO RELATED APPLICATIONS

This application is related to co-pending U.S. patent application Ser. No. 16/289,437, entitled "Dynamic partition of a security system" and is incorporated herewith in its entirety.

BACKGROUND

Home security system can be used to notify the homeowner of intrusions and other alerts (e.g., porch light left on all night). These security systems communicate with sensors placed throughout a facility (e.g., home, office). However, the hardware settings on these security system limits the number of available zones. Thus, a homeowner wishing to add another zone to monitor an in-law unit of his home may need to purchase another security system that is capable of monitoring two zones.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
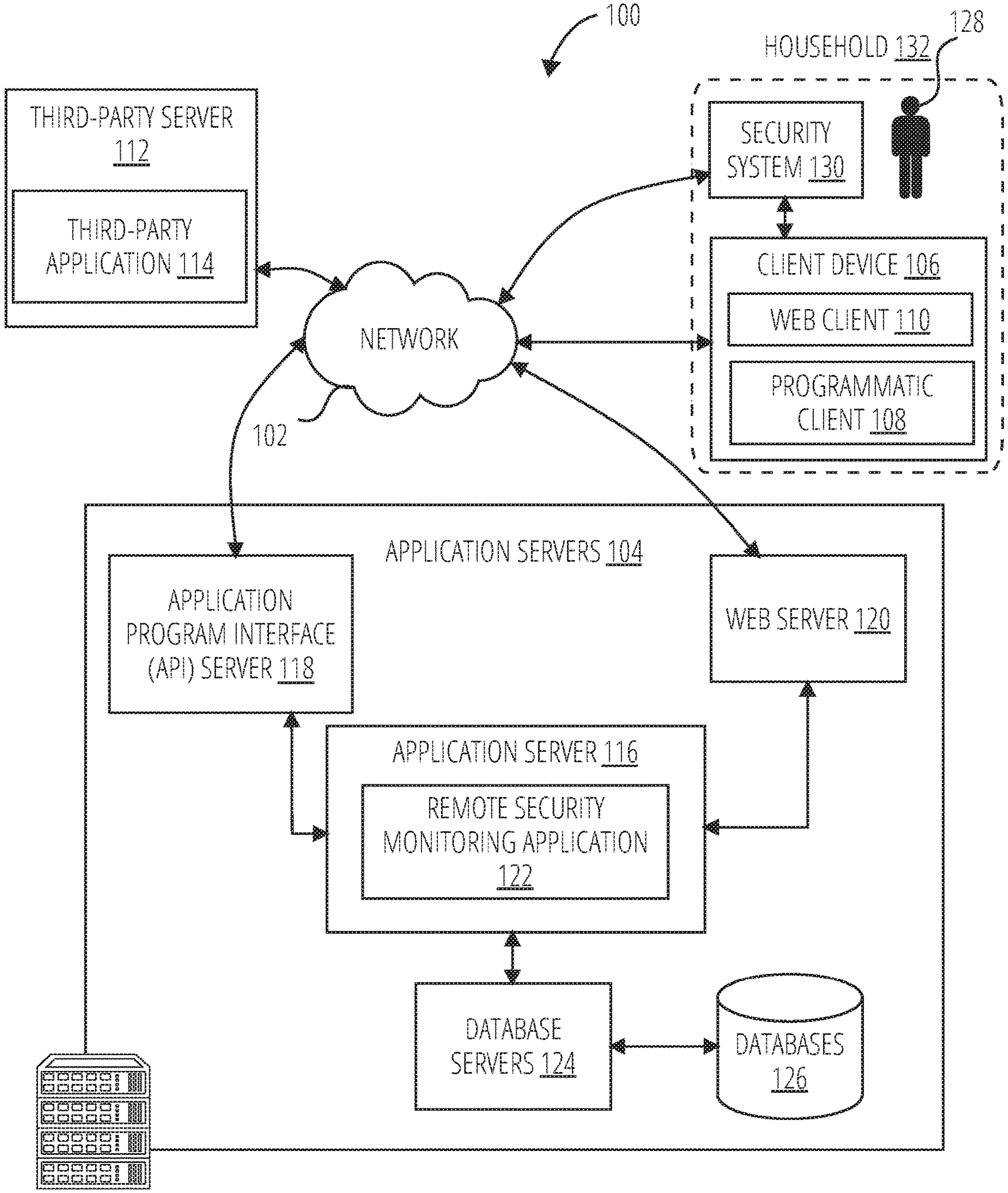
FIG. 1 is a diagrammatic representation of a networked environment in which the present disclosure may be deployed, in accordance with some example embodiments.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

Example methods and systems are directed to partitioning of security systems. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A homeowner (and user of a security system) may want to two separate partitions for their property: one for their house and one for their garage. In another example, a company may want dozens of partitions to monitor the security of a row of locked cabinets in a lab. Some security systems may not dynamically increase or decrease the number of partitions because those security systems are already hardwired for a preset number of static partitions.

The present application describes a method for dynamically partitioning a security system. In one example embodiment, a security system identifies a plurality of sensors in communication with a security system; identifies a partition attribute for each sensor of the plurality of sensors, the partition attribute indicating one or more partitions of the security system for a corresponding sensor of the plurality of sensors; and forms a plurality of partitions of the security system based on the partition attributes of the plurality of sensors. In another example embodiment, a hardwired security system with a static preset number of partitions may dynamically adjust a number of virtual partitions.

FIG. 1 is a diagrammatic representation of a network environment 100 in which some example embodiments of the present disclosure may be implemented or deployed.

One or more application servers 104 provide server-side functionality via a network 102 to a networked user device, in the form of a security system 130 and a client device 106 of the user 128. The security system 130 includes a control panel (not shown) connected to sensors in a household 132 of the user 128. A web client 110 (e.g., a browser) and a programmatic client 108 (e.g., an "app") are hosted and execute on the client device 106. The client device 106 can communicate with the security system 130 via the network 102 or via other wireless or wired means with security system 130.

An Application Program Interface (API) server 118 and a web server 120 provide respective programmatic and web interfaces to application servers 104. A specific application server 116 hosts a remote security monitoring application 122 that operates with the security system 130. In one example, the remote security monitoring application 122 receives an alert from a sensor of the security system 130, identifies a partition associated with the alert, and communicates the alert to a mobile device (or a control panel) associated with the partition.

The web client 110 communicates with the remote security monitoring application 122 via the web interface supported by the web server 120. Similarly, the programmatic client 108 communicates with the remote security monitoring application 122 via the programmatic interface provided by the Application Program Interface (API) server 118. The third-party application 114 may, for example, be a topology application that determines the topology of a factory (e.g., how many cabinets, rooms, which rooms contain valuable items), building, apartment complex, or neighborhood. The application server 116 is shown to be communicatively coupled to database servers 124 that facilitates access to an information storage repository or databases 126. In an example embodiment, the databases 126 includes storage devices that store information to be published and/or processed by the remote security monitoring application 122.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. In one example, the third-party server 112 communicates with another remote controlled device (e.g., smart door lock) located at the household 132. The third-party server 112 provides the door lock status to the security system 130, the client device 106, or the application server 116. In another example, the security system 130, the client device 106, and the application server 116 can control the door lock via the third-party application 114.

Figure 2:
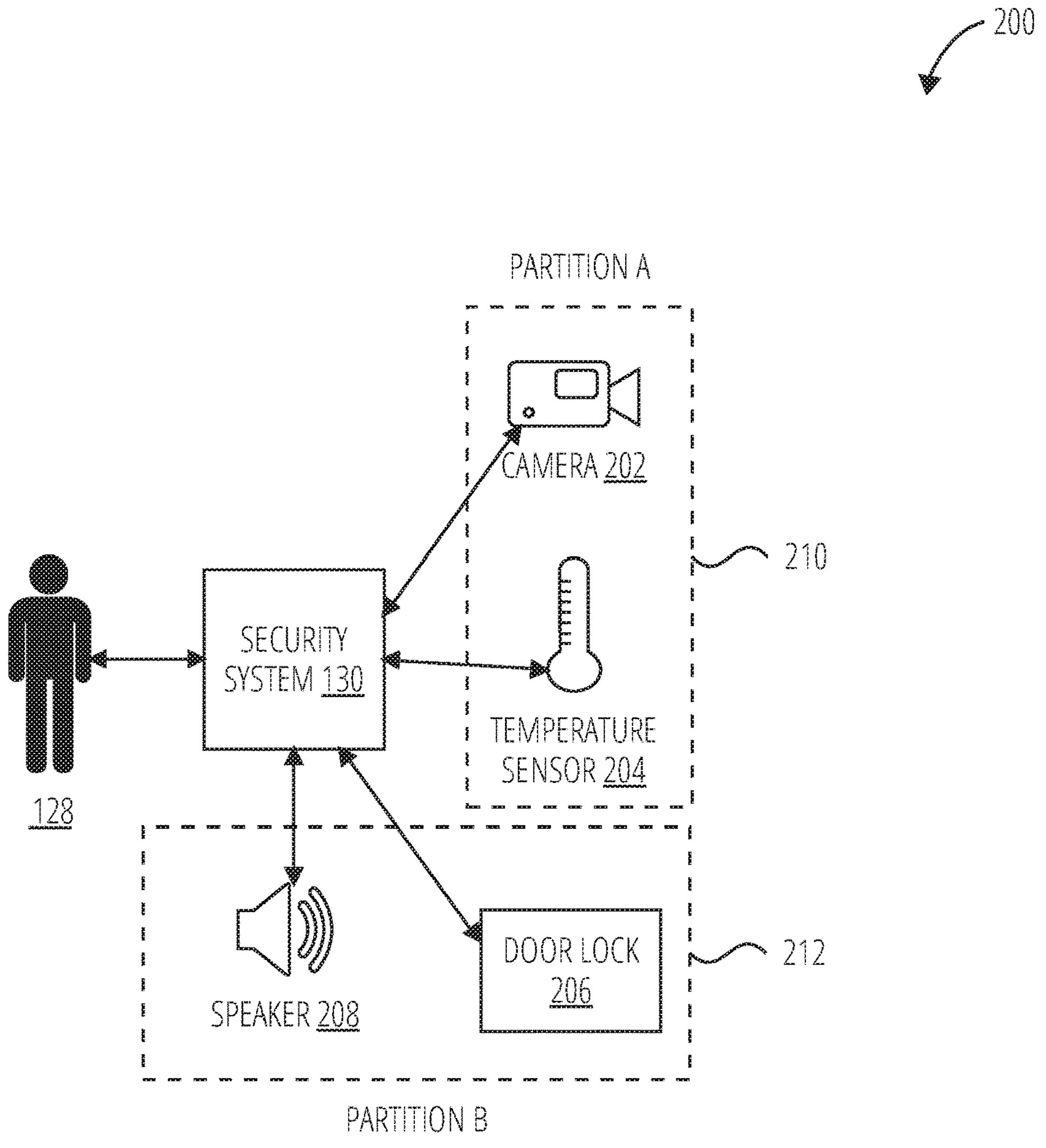
FIG. 2 is a block diagram illustrating an example of a security system in accordance with one example embodiment.

FIG. 2 is a block diagram of a system 200 illustrating an example of a security system in a household in accordance with one example embodiment. The household 132 includes, for example, the user 128 and the security system 130. The security system 130 is connected to sensors and remotely controlled devices. The sensors may include sensor devices (e.g., camera 202, a temperature sensor 204) and remotely controlled devices (e.g., a door lock 206, a speaker 208). Those of ordinary skills in the art will recognize that other types of sensors (besides the ones illustrated in FIG. 2) may be connected to the security system 130.

The security system 130 (although hardwired to operate with one partition) may be partitioned to operate as two virtual security systems. For example, the security system 130 forms two partitions: Partition A 210 and Partition B 212. Partition A 210 includes camera 202 and temperature sensor 204. Partition B 212 includes speaker 208 and door lock 206. Those of ordinary skill in the art will recognize that partitions may include a combination of any of the sensors and devices. For example, Partition B 212 can also include temperature sensor 204 (which is also part of Partition A 210).

The security system 130 can be configured to operate both partitions as the same time by receiving sensor data from the corresponding sensors and controlling the sensors corresponding to the partitions. In another example, the security system 130 may enable the user 128 to operate only Partition A 210 and another user to operate only Partition B 212 (based on the access rights of the user 128).

Figure 3:
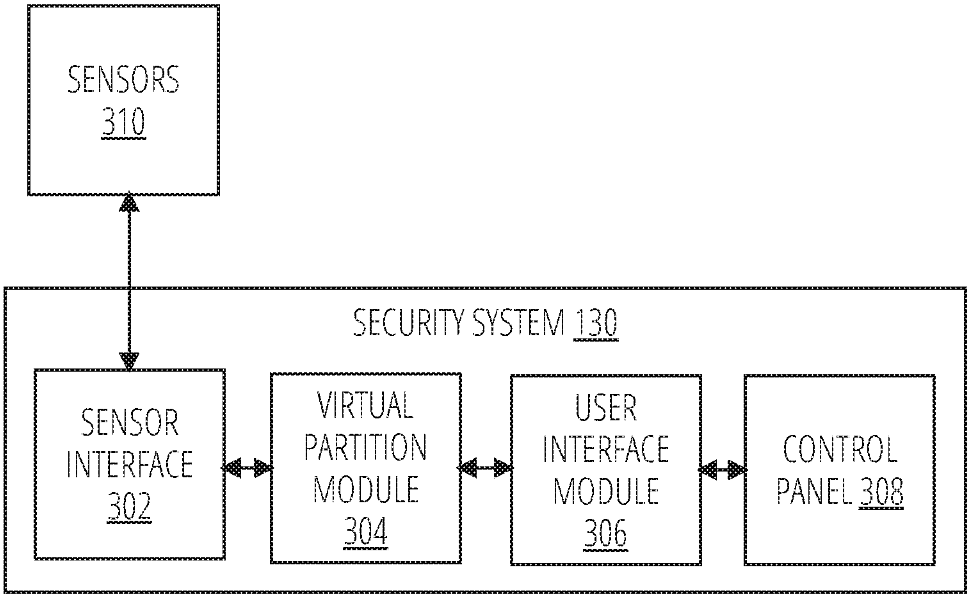
FIG. 3 illustrates components of a security system in accordance with one example embodiment.

FIG. 3 illustrates components of a security system in accordance with one example embodiment. The security system 130 includes a sensor interface 302, a virtual partition module 304, a user interface module 306, and a control panel 308. The security system 130 communicates, via the sensor interface 302, with sensors 310 disposed in a physical facility (e.g., a home, a building, a factory, a campus). For example, the sensor interface 302 identifies the sensors 310 and accesses sensor data from the sensors 310. In one example, the sensors 310 are registered with the security system 130.

In one example embodiment, the sensor interface 302 identifies a partition attribute for each sensor of sensors 310. For example, the partition attribute of a sensor identifies one or more specific partitions to which the sensor is assigned to. In another example, the partition attribute of a safety related sensor (e.g., smoke sensor) identifies all partitions of the security system 130. In another example, the partition attribute of a sensor may be set to identify all partitions of the security system 130 by default. In another example, the partition attribute of a sensor may be set to identify a partition of the security system 130 based on a location of the sensor (e.g., sensors at home are to be assigned to home partition).

The virtual partition module 304 forms one or more partitions based on the partition attributes of the sensors 310. For example, the virtual partition module 304 forms a first partition for a first and second sensor of sensors 310. The first and second sensors each include a partition attribute that identifies the first partition. The virtual partition module 304 forms a second partition based on a third and fourth sensor of sensors 310. The second and third sensors each include a partition attribute that identifies the second partition.

The user interface module 306 generates a user interface for each partition based on the sensors identified in the corresponding partition. In one example, the user interface may identify a name of the partition, a description of the partition, sensors in the partition, sensor status, and authorized users having access to the partition (e.g., renters having access to sensor data from sensors in their apartment, and landlord having access to sensor data of sensors from a building). This allows both the renters and landlord to use the single security system 130 with different partitions.

The control panel 308 includes a display and user input that enables the user 128 to control the features of the security system 130 corresponding to a partition. For example, the user 128 may arm a first partition and disarm a second partition using the control panel 308. In another example, the control panel 308 identifies the user 128 and provides the user 128 with access to the corresponding partition (e.g., one partition at a time or several partitions at a time). In another example, the control panel 308 may be a virtual control panel that is accessed via a client device 106 or a computing device registered with the security system 130. The control panel 308 receives the different user interfaces from the user interface module 306 for each partition.

Figure 4:
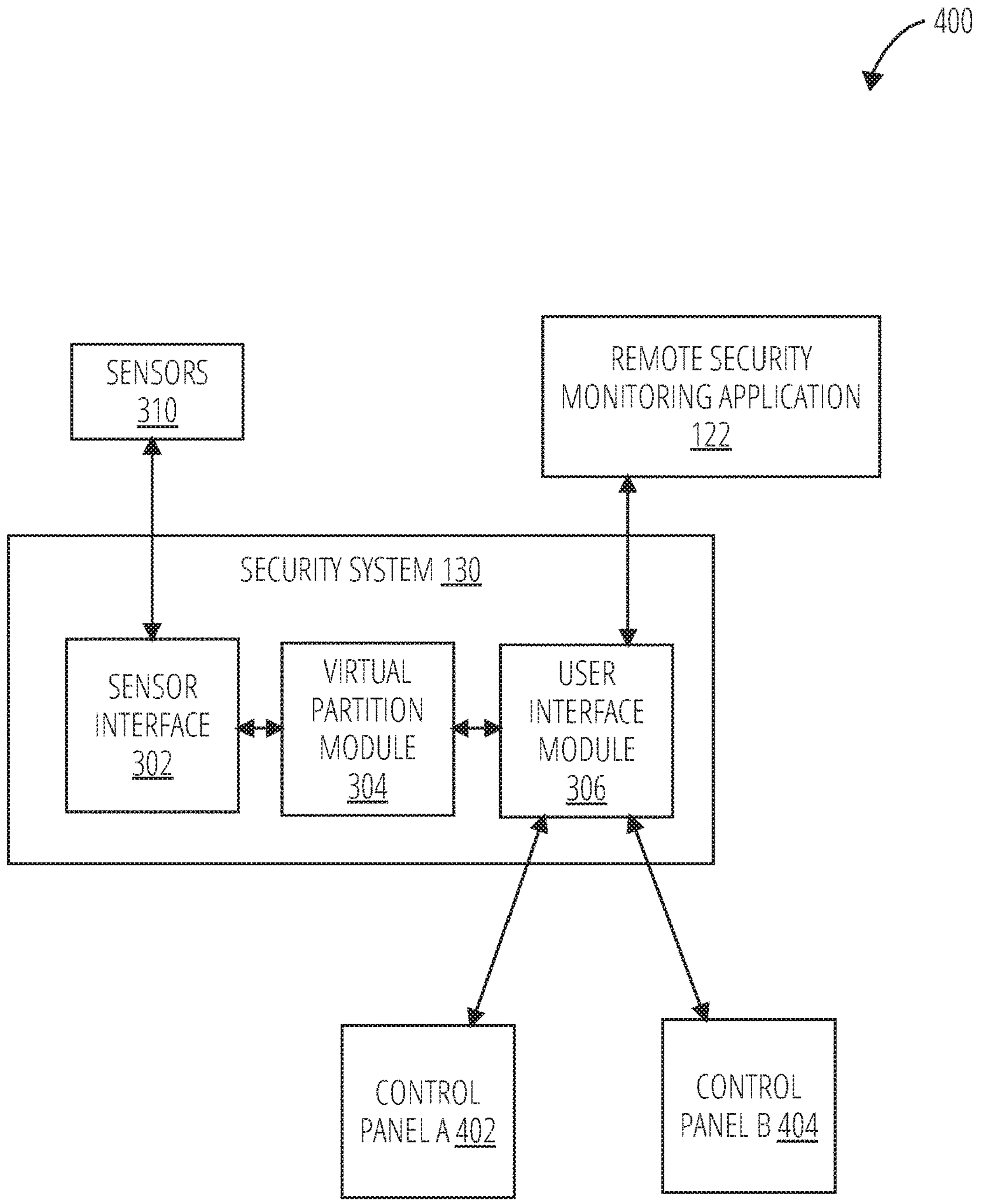
FIG. 4 illustrates components of a security system in accordance with another example embodiment.

FIG. 4 illustrates components of a security system in accordance with another example embodiment. The user interface module 306 generates a user interface for each partition based on the partition attributes of the sensors. The user interface module 306 communicates user interfaces corresponding to the control panel A 402 and control panel B 404. The control panel A 402 and control panel B 404 are external to the security system 130 and communicate with the security system 130. For example, the security system 130 may be located in a basement of an apartment building while the control panel A 402 is located in a first apartment of the apartment building and the control panel B 404 is located in a second apartment of the apartment building.

In one example embodiment, the user interface module 306 determines that a first user interface for a first partition refers to the control panel A 402. The user interface module 306 then communicates the first user interface and sensor data of the sensors corresponding to the partition of the first user interface to the control panel A 402. The user interface module 306 determines that a second user interface for a second partition refers to the control panel B 404. The user interface module 306 then communicates the second user interface and sensor data of the sensors corresponding to the partition of the second user interface to the control panel B 404.

The control panel A 402 includes a display and user input that enables a user at the control panel A 402 to control the features of the security system 130. For example, the user may control features corresponding to a first partition at control panel A 402. The control panel B 404 includes a display and user input that enables a user at the control panel B 404 to control the features of the security system 130. For example, the user may control features corresponding to a first partition at control panel A 402.

Figure 5:
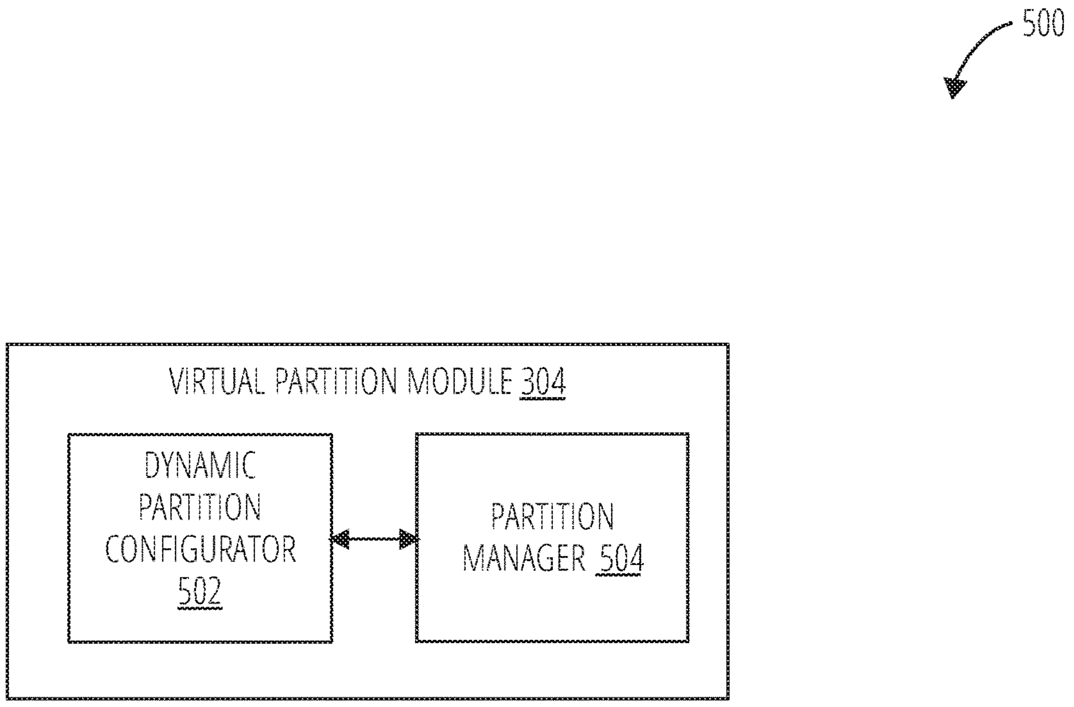
FIG. 5 illustrates components of a virtual partition module in accordance with one example embodiment.

FIG. 5 illustrates components of a virtual partition module in accordance with one example embodiment. The virtual partition module 304 includes a dynamic partition configurator 502 and a partition manager 504. The dynamic partition configurator 502 enables an administrator or installer of the security system 130 to define virtual partitions. An example operation of the dynamic partition configurator 502 is described further below with respect to FIG. 10. The partition manager 504 enables the security system 130 to relay the sensor data to the control panel associated with the partition corresponding to the sensor of the sensor data. An example operation of the dynamic partition configurator 502 is described further below with respect to FIG. 11.

Figure 6:
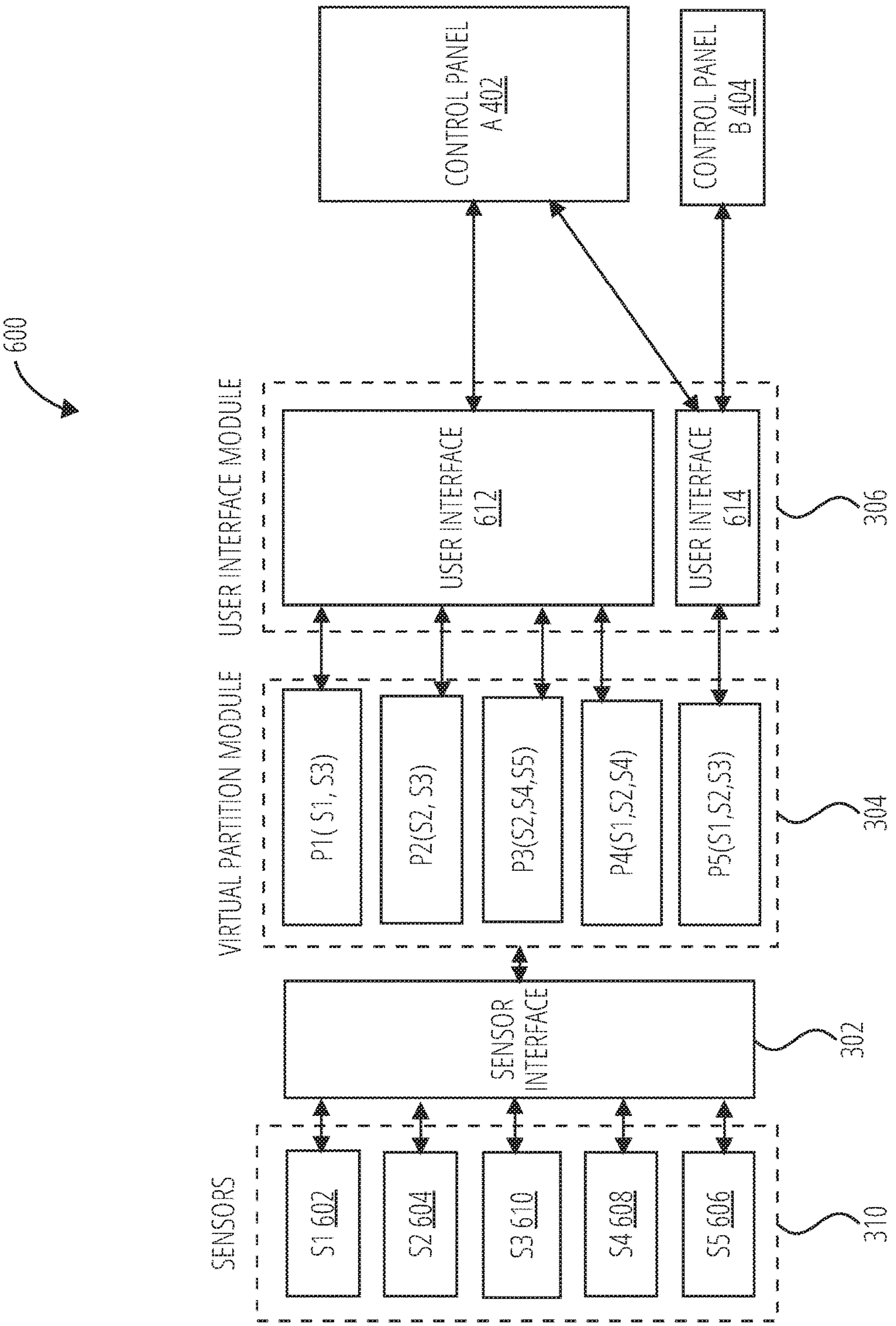
FIG. 6 illustrates an example of partitions of a security system in accordance with one example embodiment.

FIG. 6 illustrates an example of partitions of a security system in accordance with one example embodiment. Sensors 310 includes sensors s1 602, s2 604, s3 610, s4 608, and s5 606. The sensor interface 302 communicates with the sensors 310. In one example, the sensor interface 302 accesses partition attributes and sensor data from the sensors 310. The partition attributes identify the partition to which a corresponding sensor is assigned to. For example, sensor s1 602 is assigned to partitions p1 and p4. Sensor s2 604 is assigned to partitions p2 and p4. Sensor s3 610 is assigned to partitions p1 and p2. Sensor s4 608 is assigned to partitions p2 and p4. Sensor s5 606 is assigned to partitions p3.

The virtual partition module 304 uses the partition attributes from the sensors 310 to form the partitions: partition p1 includes data from sensors s1 602, s3 610. Partition p2 includes data from sensors s2 604, s3 610, and s4 608. Partition p3 includes data from sensor s5 606. Partition p4 includes data from sensors s1 602, s2 604, and s4 608.

The user interface module 306 generates a user interface 612 for partitions p1, p2, and p4. The user interface module 306 generates a user interface 614 for partition p3. The control panel A 402 accesses the user interface 612. The control panel B 404 accesses the user interface 614. In one example, each partition includes a corresponding user interface. In another example, one or more partitions may share a user interface. In the example of FIG. 6, the control panel A 402 can access both the user interface 614 and user interface 612.

Figure 7:
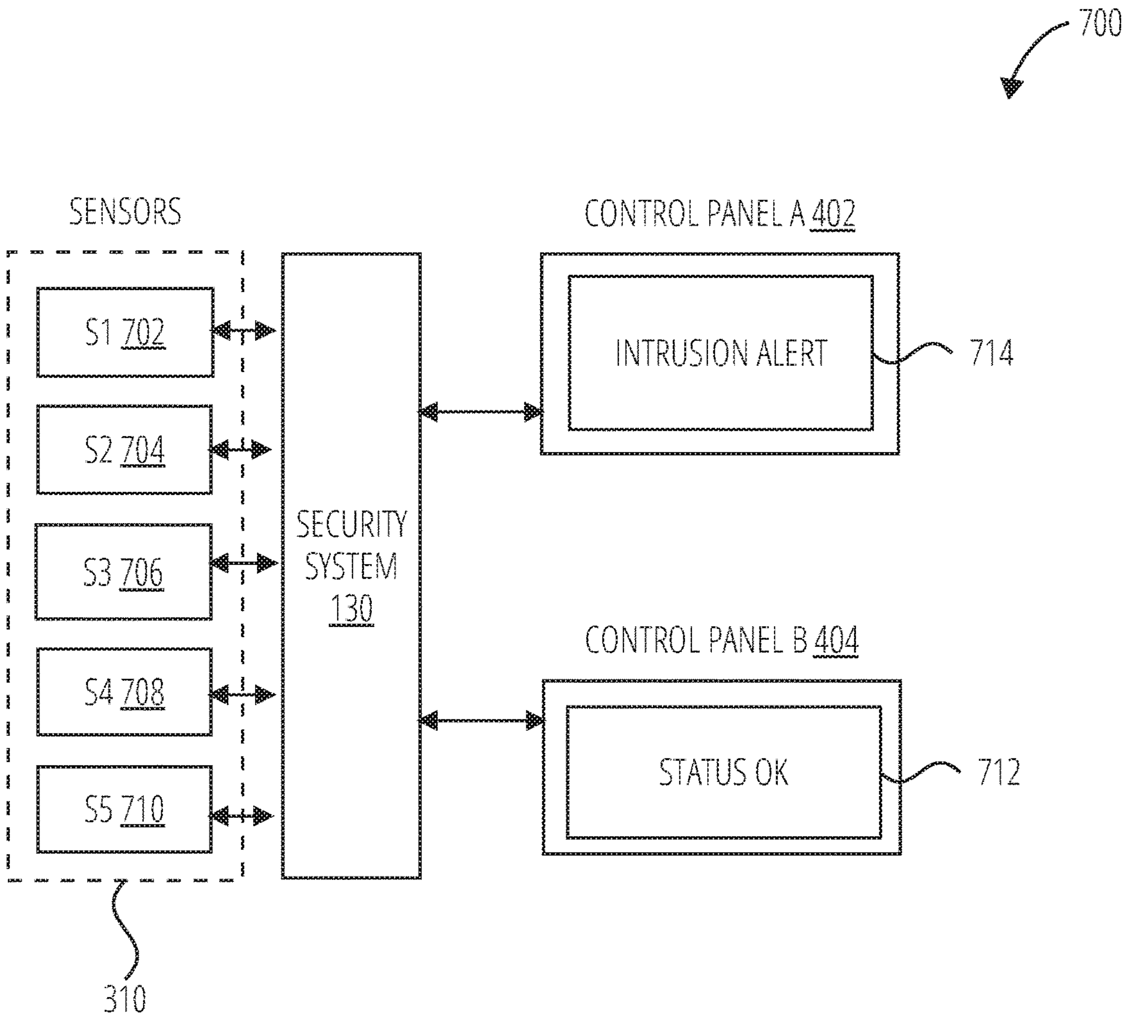
FIG. 7 illustrates an example of partitions of a security system in accordance with another example embodiment.

FIG. 7 illustrates an example of partitions of a security system in accordance with another example embodiment. Although both control panel A 402 and control panel B 404 are connected to the same security system 130, each control panel may display a different status. For example, the control panel A 402 detects a breach (e.g., door open) on one of its sensors (e.g., s1 702) and displays an intrusion alert 714 notification. The control panel B 404 determines that the sensor data on its corresponding sensors of its partition indicate that all doors and windows are closed. The control panel B 404 displays status ok 712 notification.

Figure 8:
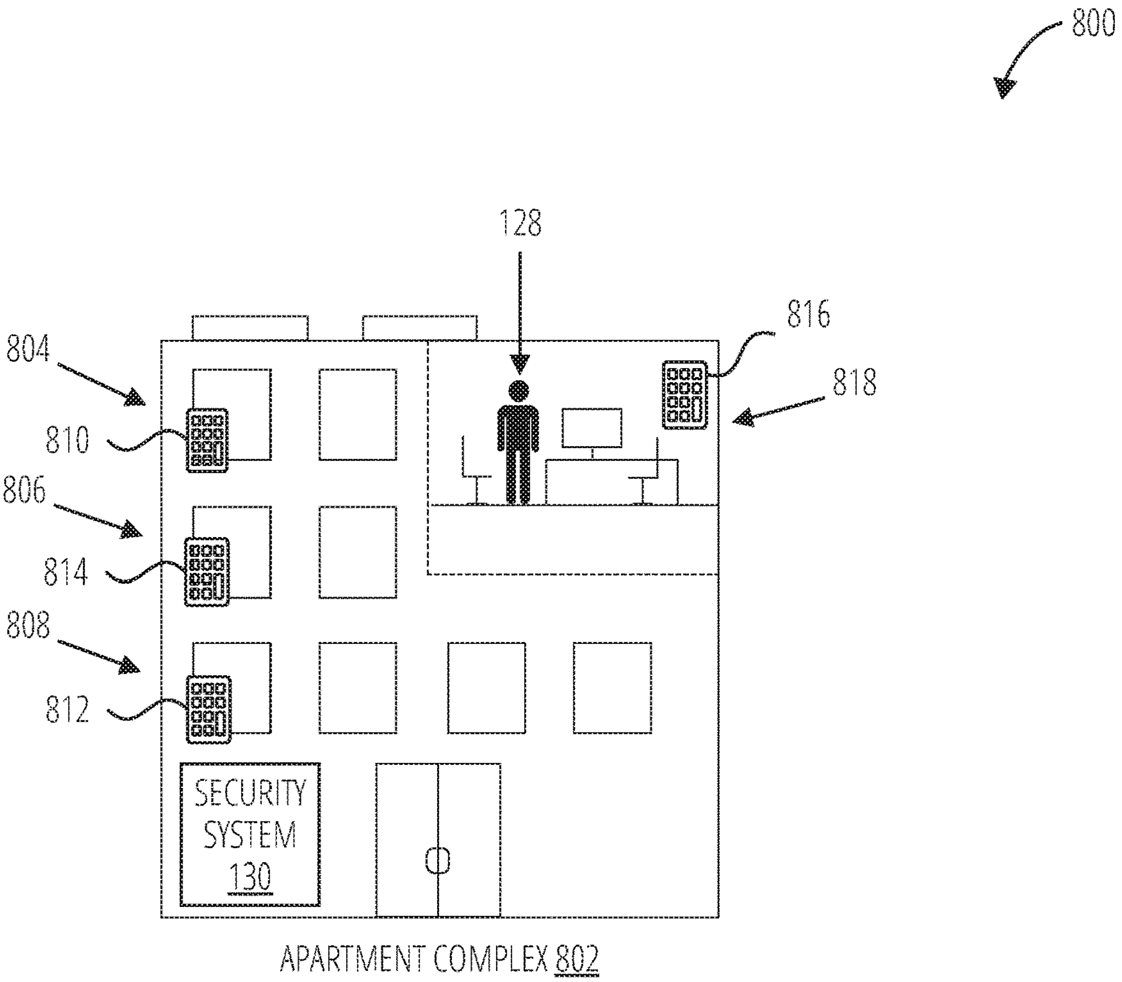
FIG. 8 is a block diagram illustrating an operation of a security system in accordance with one example embodiment.

FIG. 8 is a block diagram 300 illustrating a security system with partitions in an apartment complex. The apartment complex 802 includes one security system 130 installed in a first floor of the apartment complex 802. Each floor may include one or more apartment units: apartment 804, apartment 806, apartment 808, and apartment 818. Each apartment may be equipped with its own set of windows and doors sensors (not shown). A control panel may be installed in each apartment. For example, control panel 816 is located in apartment 818. Control panel 810 is located in apartment 804. Control panel 814 is located in apartment 806. Control panel 812 is located in apartment 808.

The control panels 816, 810, 814, 812 are connected to the security system 130. The security system 130 creates a partition for each apartment such that each user can control and access security features related to its apartment. For example, user 128 can arm or disarm sensors located in apartment 818 using control panel 816. In another example embodiment, an administrator (e.g., landlord) may have access to all sensors and access controls in the apartment complex 802. For example, the landlord can remotely monitor which door or window (in the apartment complex 802) is open or close using the security system 130.

Figure 9:
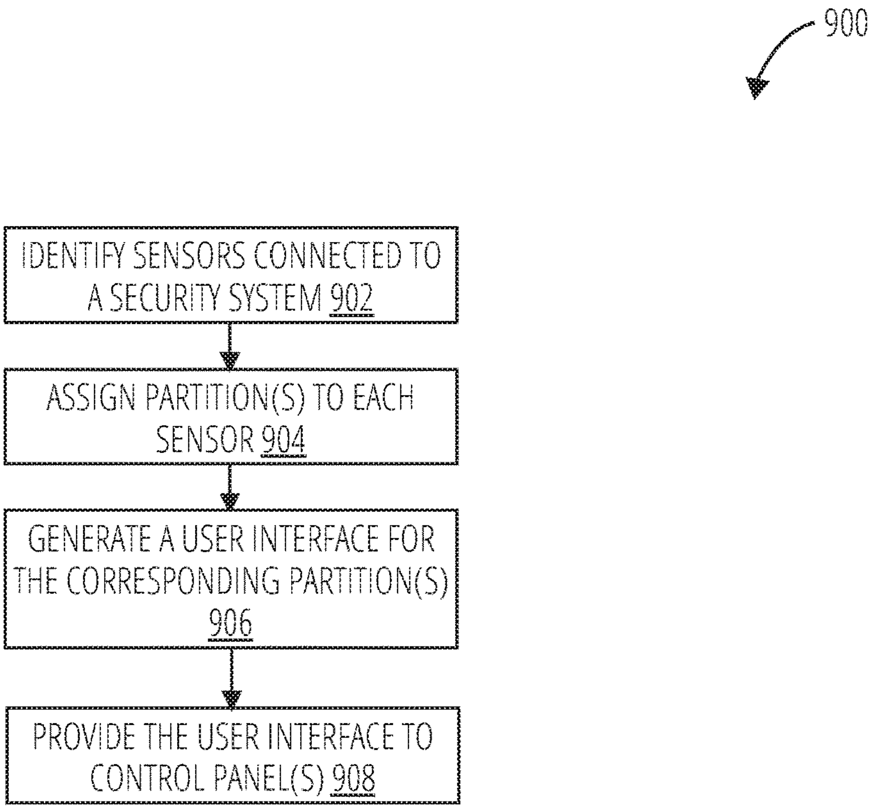
FIG. 9 is a flow diagram illustrating a method for generating a user interface for each partition in accordance with one example embodiment.

FIG. 9 is a flow diagram illustrating a method for generating a user interface for each partition in accordance with one example embodiment. Operations in the method 900 may be performed by the security system 130, using components (e.g., modules, engines) described above with respect to FIG. 3. Accordingly, the method 900 is described by way of example with reference to the security system 130. However, it shall be appreciated that at least some of the operations of the method 900 may be deployed on various other hardware configurations or be performed by similar components residing elsewhere.

At block 902, the security system 130 identifies sensors connected to the security system 130. At block 904, the security system 130 assigns a partition to each sensor. In another example embodiment, the memory 1304 defines/forms partitions based on the partition identified in the partition attribute of each sensor. At block 906, the security system 130 generates a user interface for the corresponding partition(s). At block 908, the security system 130 provides the user interface to the control panel(s).

Figure 10:
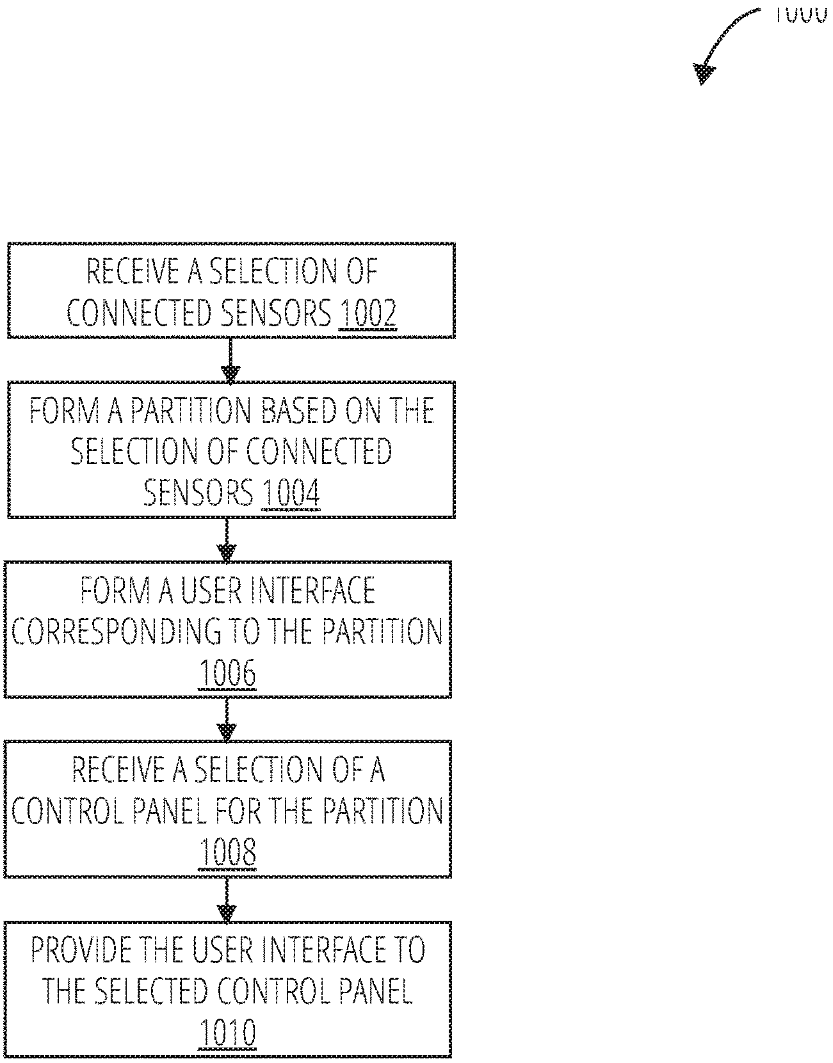
FIG. 10 is a flow diagram illustrating a method for providing a user interface for each partition to a control panel in accordance with one example embodiment.

FIG. 10 is a flow diagram illustrating a method 1000 for providing a user interface for each partition to a control panel in accordance with one example embodiment. Operations in the method 1000 may be performed by the virtual partition module 304, using components (e.g., modules, engines) described above with respect to FIG. 5. Accordingly, the method 1000 is described by way of example with reference to the virtual partition module 304. However, it shall be appreciated that at least some of the operations of the method 1000 may be deployed on various other hardware configurations or be performed by similar components residing elsewhere.

At block 1002, the dynamic partition configurator 502 receives a selection of connected sensors (e.g., a user identifies or selects which sensors to be included in a partition). At block 1004, the dynamic partition configurator 502 forms a partition based on the selection of connected sensors. At block 1006, the dynamic partition configurator 502 forms a user interface corresponding to the partition. At block 1008, the dynamic partition configurator 502 receives a selection of a control panel for partition. At block 1010, the dynamic partition configurator 502 provides the user interface to the selected control panel.

Figure 11:
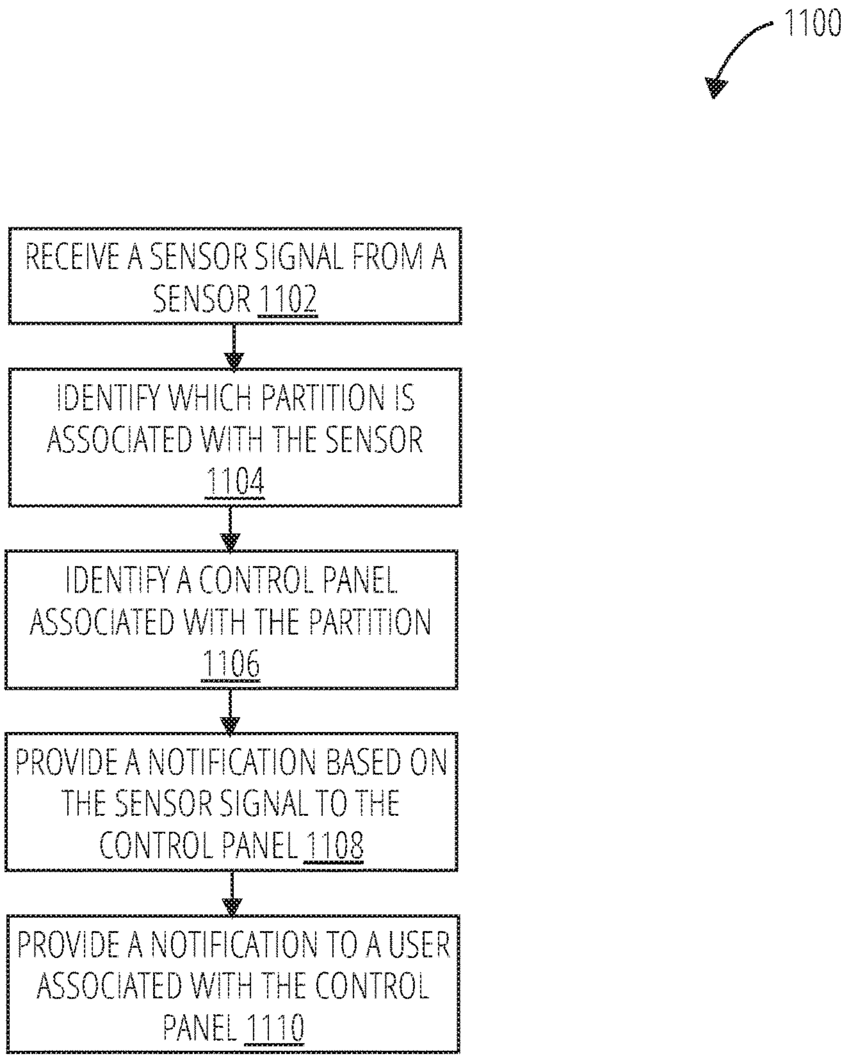
FIG. 11 is a flow diagram illustrating a method for providing a notification to a control panel in accordance with one example embodiment.

FIG. 11 is a flow diagram illustrating a method for providing a notification to a control panel in accordance with one example embodiment. Operations in the method 1100 may be performed by the virtual partition module 304, using components (e.g., modules, engines) described above with respect to FIG. 5. Accordingly, the method 1100 is described by way of example with reference to the virtual partition module 304. However, it shall be appreciated that at least some of the operations of the method 1100 may be deployed on various other hardware configurations or be performed by similar components residing elsewhere.

At block 1102, the partition manager 504 receives a sensor signal (e.g., door open signal) from a sensor (e.g., contact sensor). At block 1104, the partition manager 504 identifies which partition is associated with the sensor. At block 1106, the partition manager 504 identifies which control panel is associated with the partition. At block 1108, the partition manager 504 provides a notification to the identified control panel based on the sensor signal. At block 1110, the partition manager 504 provides a notification to a user associated with the identified control panel.

Figure 12:
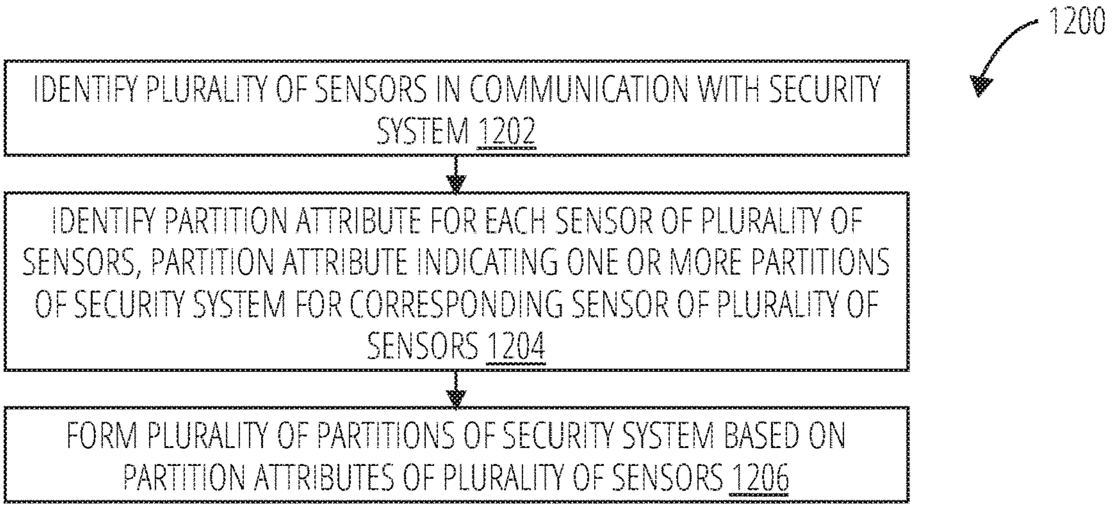
FIG. 12 illustrates a routine in accordance with one embodiment.

FIG. 12 illustrates a routine in accordance with one embodiment. In block 1202, routine 1200 identifies a plurality of sensors in communication with a security system. In block 1204, routine 1200 identifies a partition attribute for each sensor of the plurality of sensors, the partition attribute indicating one or more partitions of the security system for a corresponding sensor of the plurality of sensors. In block 1206, routine 1200 forms a plurality of partitions of the security system based on the partition attributes of the plurality of sensors.

Figure 13:
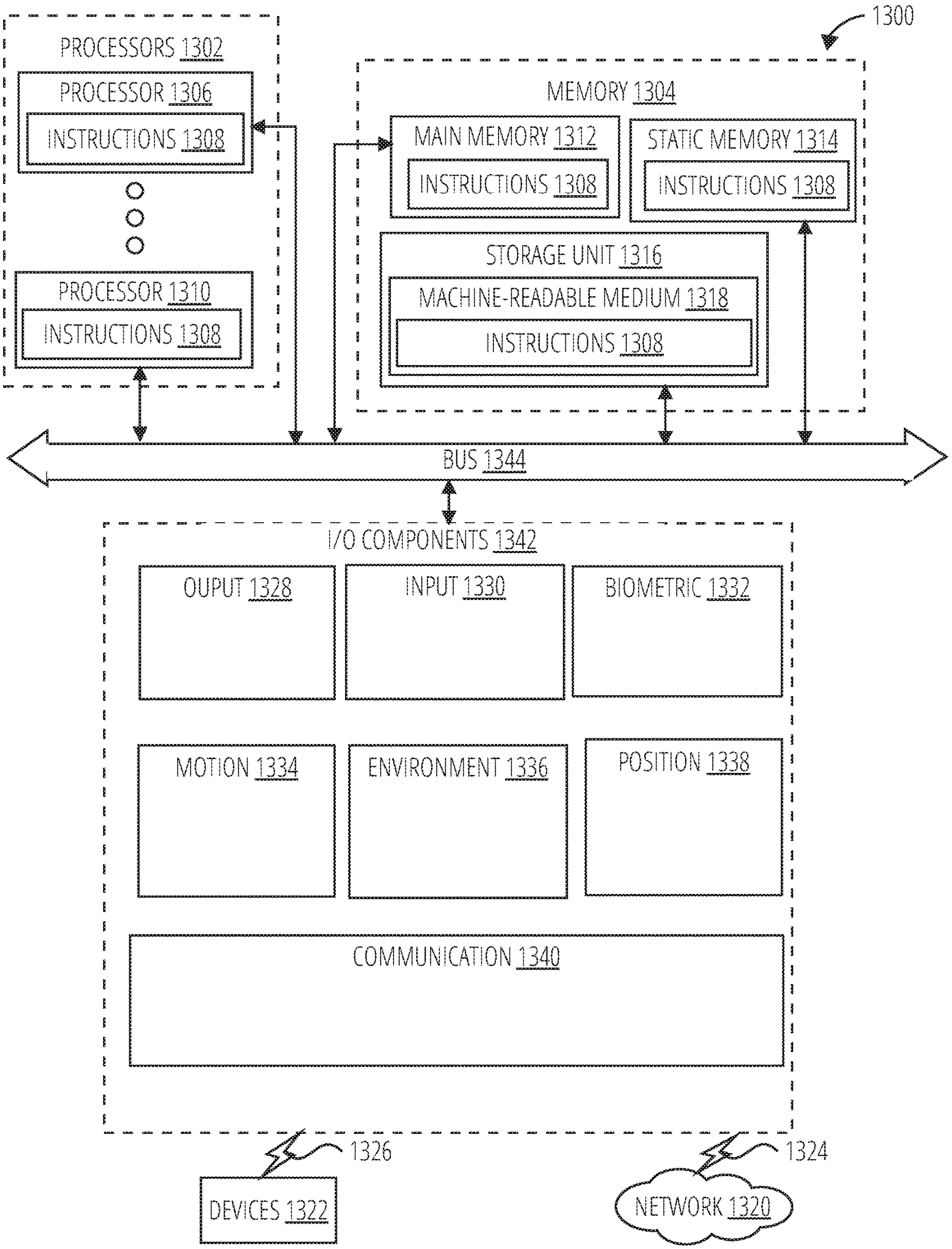
FIG. 13 is a diagrammatic representation of a machine in the form of a computer system within which a set of instructions may be executed for causing the machine to perform any one or more of the methodologies discussed herein, according to an example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, dill be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method comprising: identifying a plurality of sensors in communication with a security system; identifying a partition attribute for each sensor of the plurality of sensors, the partition attribute indicating one or more partitions of the security system for a corresponding sensor of the plurality of sensors; and forming a plurality of partitions of the security system based on the partition attributes of the plurality of sensors.

In example 2, the subject matter of example 1, further comprises: generating a user interface for one or more partitions, each user interface providing status information of the one or more sensors associated with the corresponding partition.

In example 3, the subject matter of example 1, further comprises: providing the user interface for the one or more partitions to a control panel of the security system, the control panel configured to display the user interface in a display of the control panel, and to control a portion of settings of the security system, the portion of settings being based on the one or more partitions.

In example 4, the subject matter of example 1, further comprises: identifying a first control panel associated with a first partition of the plurality of partitions, the first control panel remotely connected to the security system; identifying a second control panel associated with a second partition of the plurality of partitions, the second control panel remotely connected to the security system; providing a first user interface associated with the first partition to the first control panel; and providing a second user interface associated with the second partition to the second control panel.

In example 5, the subject matter of example 1, further comprises: receiving, at the security system, a selection of one or more sensors from the plurality of sensors; forming a first partition based on the selection of the one or more sensors from the plurality of sensors; receiving, at the security system, an identification of a first control panel for the partition; forming a first user interface based on the selection of one or more sensors and the first partition; and communicating the first user interface to the first control panel.

In example 6, the subject matter of example 1, further comprises: accessing a sensor status of a sensor of the plurality of sensors; identifying a partition associated with the sensor based on the partition attribute of the sensor; identifying a control panel corresponding to the partition; and providing the sensor status to the control panel.

In example 7, the subject matter of example 6, wherein the control panel includes a user interface associated with the partition, the user interface configured to display the sensor status.

In example 8, the subject matter of example 1, further comprises: accessing a sensor status for a sensor of the plurality of sensors; determining a breach event based on the sensor status; identifying a partition associated with the sensor based on the partition attribute of the sensor; identifying a control panel corresponding to the partition; generating a notification identifying the breach event and the corresponding sensor; and providing the notification of the breach event and the corresponding sensor to the control panel.

In example 9, the subject matter of example 1, further comprises: receiving, at the security system, a first selection of one or more sensors from the plurality of sensors; receiving, at the security system, a second selection of one or more sensors from the plurality of sensors; forming a first partition based on the partition attributes of the one or more sensors of the first selection; forming a second partition based on the partition attributes of the one or more sensors of the second selection; forming a first user interface based on the first partition, the first user interface identifying the first partition; forming a second user interface based on the second partition, the second user interface identifying the second partition; and communicating the first user interface and the second user interface to a mobile device registered with the security system.

In example 10, the subject matter of example 1, further comprises: communicating the user interface to a remote security monitoring application registered with the security system.

What is claimed is:

1. A method comprising:

identifying a plurality of sensors in communication with a security system, wherein each of the sensors is initially associated with one physical partition or multiple physical partitions of the security system, the security system comprising a preset static number of physical partitions;

in response to an administrator user input, updating a respective partition attribute for each sensor of the plurality of sensors to assign each sensor to one or more user-selected virtual partitions of the security system;

forming virtual security systems based on the user-selected virtual partitions and the updated partition attributes of the plurality of sensors;

storing information about the virtual partitions at the security system; and operating the virtual security systems independently and according to the virtual partitions.

2. The method of claim 1, further comprising:

generating a user interface for one or more of the virtual partitions, each user interface providing status information of the one or more sensors associated with the corresponding virtual partition.

3. The method of claim 1, further comprising:

providing a respective user interface for each of the one or more virtual partitions to a control panel of the security system, the control panel configured to display each user interface in a display of the control panel, and to control a portion of settings of the security system associated only with a particular displayed user interface for a particular virtual partition.

4. The method of claim 1, further comprising:

identifying a first control panel associated with a first virtual partition of the user-selected virtual partitions, the first control panel remotely connected to the security system;

identifying a second control panel associated with a second virtual partition of the user-selected virtual partitions, the second control panel remotely connected to the security system;

providing a first user interface associated with the first virtual partition to the first control panel; and providing a different second user interface associated with the second virtual partition to the second control panel.

5. The method of claim 1, further comprising:

receiving, at the security system, a selection of one or more sensors from the plurality of sensors;

forming a first virtual partition, of the one or more user-selected virtual partitions, based on the selection of the one or more sensors from the plurality of sensors;

receiving, at the security system, an identification of a first control panel for the virtual partition;

forming a first user interface based on the selection of one or more sensors and the first virtual partition; and communicating the first user interface to the first control panel.

6. The method of claim 1, further comprising:

accessing a sensor status of a sensor of the plurality of sensors;

identifying a virtual partition associated with the sensor based on the partition attribute of the sensor;

identifying a control panel corresponding to the virtual partition; and providing the sensor status to the control panel.

7. The method of claim 6, wherein the control panel includes a user interface associated exclusively with the virtual partition, the user interface configured to display the sensor status.

8. The method of claim 1, further comprising:

accessing a sensor status for a sensor of the plurality of sensors;

determining a breach event based on the sensor status;

identifying a virtual partition associated with the sensor based on the partition attribute of the sensor;

identifying a control panel corresponding to the virtual partition;

generating a notification identifying the breach event and the corresponding sensor; and providing the notification of the breach event and the corresponding sensor to the control panel.

9. The method of claim 1, further comprising:

receiving, at the security system, a first selection of one or more sensors from the plurality of sensors;

receiving, at the security system, a second selection of one or more sensors from the plurality of sensors;

forming a first virtual partition based on the partition attributes of the one or more sensors of the first selection;

forming a second virtual partition based on the partition attributes of the one or more sensors of the second selection;

forming a first user interface based on the first virtual partition, the first user interface identifying the first virtual partition;

forming a second user interface based on the second virtual partition, the second user interface identifying the second virtual partition; and communicating the first user interface and the second user interface to a mobile device registered with the security system.

10. The method of claim 1, wherein each of the plurality of sensors is initially associated with all of the physical partitions of the security system, and wherein in response to the administrator user input, updating the respective partition attribute includes assigning each sensor to one or more of the respective user-selected virtual partitions comprising fewer than all of the physical partitions of the security system.

11. The method of claim 1, wherein updating the respective partition attribute for each sensor includes assigning at least one sensor to multiple virtual partitions of the security system.

12. A computing apparatus, the computing apparatus comprising:

a processor; and a memory storing instructions that, when executed by the processor, configure the apparatus to:

identify a plurality of sensors in communication with a security system, wherein each of the sensors is initially associated with multiple physical partitions of the security system, the security system comprising a preset static number of physical partitions;

receive, from an administrator user of the security system, respective partition attributes to assign each of the sensors to one or more user-selected virtual partitions of the security system;

form virtual security systems based on the user-selected virtual partitions and the respective partition attributes of the plurality of sensors;

store information about the virtual partitions at the security system; and independently operate the respective virtual security systems according to the virtual partitions.

13. The computing apparatus of claim 12, wherein the instructions further configure the apparatus to:

generate a user interface for one or more virtual partitions, each user interface providing status information of the one or more sensors associated with the corresponding virtual partition.

14. The computing apparatus of claim 12, wherein the instructions further configure the apparatus to:

receive, at the security system, a selection of one or more sensors from the plurality of sensors;

form a first virtual partition based on the selection of the one or more sensors from the plurality of sensors;

receive, at the security system, an identification of a first control panel for the virtual partition;

form a first user interface based on the selection of one or more sensors and the first virtual partition; and communicate the first user interface to the first control panel.

15. The computing apparatus of claim 12, wherein the instructions further configure the apparatus to:

access a sensor status of a sensor of the plurality of sensors;

identify a virtual partition associated with the sensor based on the partition attribute of the sensor;

identify a control panel corresponding to the virtual partition; and provide the sensor status to the control panel.

16. The computing apparatus of claim 12, wherein the instructions further configure the apparatus to:

access a sensor status for a sensor of the plurality of sensors;

determine a breach event based on the sensor status;

identify a virtual partition associated with the sensor based on the partition attribute of the sensor;

identify a control panel corresponding to the virtual partition;

generate a notification identifying the breach event and the corresponding sensor; and provide the notification of the breach event and the corresponding sensor to the control panel.

17. The computing apparatus of claim 12, wherein the instructions further configure the apparatus to assign at least one sensor of the plurality of sensors to fewer than all of the physical partitions of the security system.

18. The computing apparatus of claim 17, wherein the instructions further configure the apparatus to assign at least one sensor of the plurality of sensors to multiple virtual partitions of the security system.

19. A non-transitory computer-readable storage medium, the computer-readable storage medium including instructions that when executed by a computer, cause the computer to perform operations comprising:

identify a plurality of sensors in communication with a security system, wherein each of the sensors is initially associated with multiple physical partitions of the security system, the security system comprising a preset static number of physical partitions;

receive, from an administrator user of the security system, respective partition attributes to assign each of the sensors to one or more user-selected virtual partitions of the security system;

form virtual security systems based on the user-selected virtual partitions and the respective partition attributes of the plurality of sensors;

store information about the virtual partitions at the security system; and independently operate the respective virtual security systems according to the virtual partitions.

20. The computer-readable storage medium of claim 19, further including instructions that cause the computer to perform operations comprising assigning at least one sensor of the plurality of sensors to multiple virtual partitions of the security system.

* * * * *